UNITED STATES PATENT OFFICE.

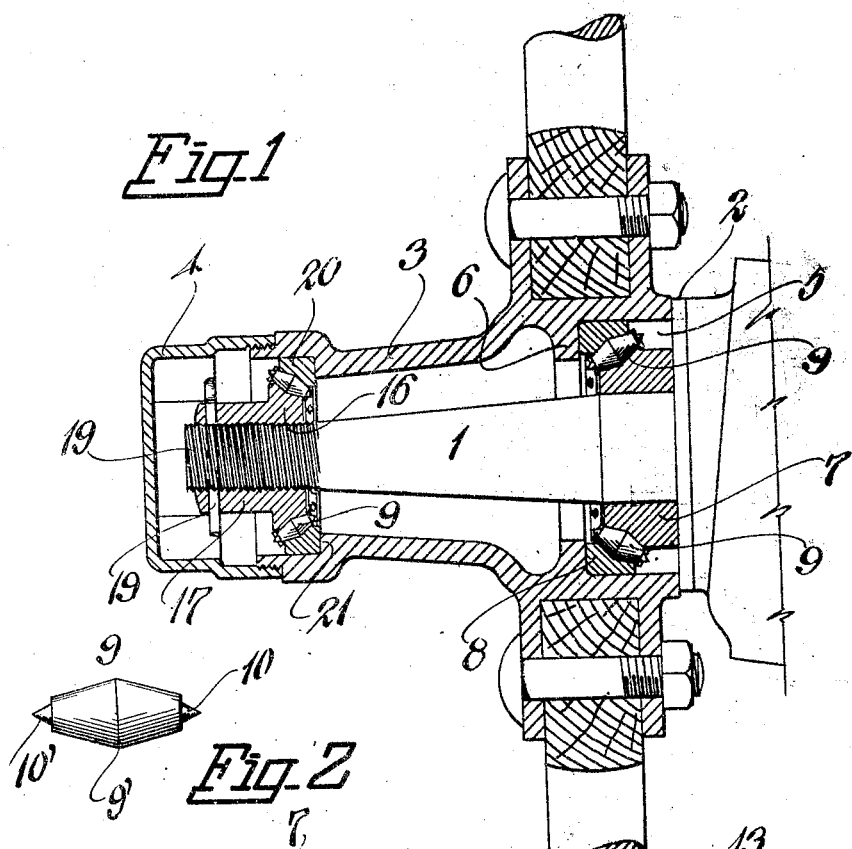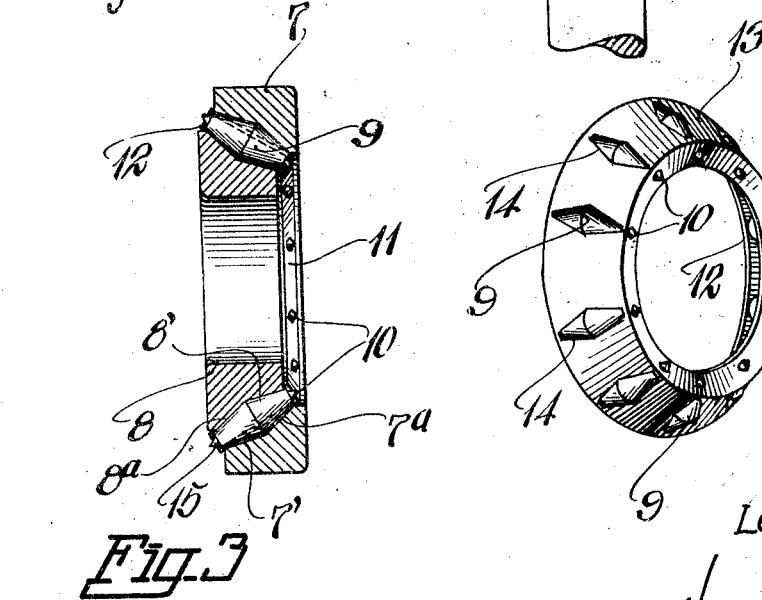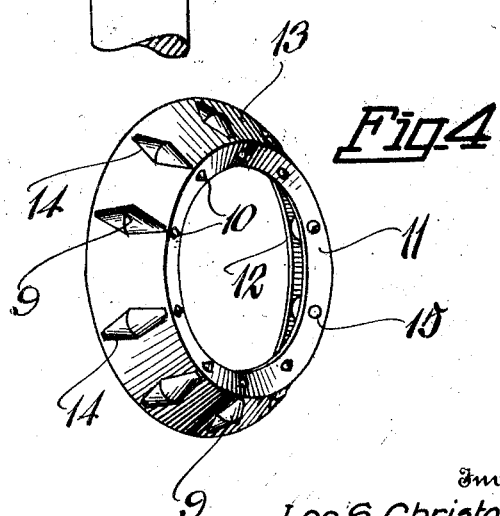

LEO S. CHRISTOPHERSON, OF SPOKANE, WASHINGTON.

ROLLER-BEARING.

1,374,987.

Specification of Letters Patent.  Patented Apr. 19, 1921.

Application filed May 13, 1920. Serial No. 380,963.

*To all whom it may concern:*

Be it known that I, LEO S. CHRISTOPHERSON, a citizen of the United States, residing at Spokane, in Spokane county, and State of Washington, have invented certain new and useful Improvements in Roller-Bearings, of which the following is a specification.

My present invention relates to improvements in roller bearings of the circular series type, and while I have herein illustrated the roller bearing in connection with the journal and hub of an automobile wheel, it will be apparent that the anti-friction bearing device may be used to support loads in other relations. The primary object of the invention is the provision of a roller bearing device of the circular series or annular type that may be adjusted with facility, which will remain in stable position for performing its functions and prevent looseness of parts, and will support the required load in acceptable manner.

With the above mentioned and other objects in view, the invention consists essentially in certain novel constructions and combinations of parts of the cone, cup and rollers, illustrated in the accompanying drawings and set forth in the claim hereto appended, it being understood that various changes in proportion, size, and adaptation of the invention as well as changes in details of construction within the scope of the claim may be resorted to without departing from the spirit or sacrificing any of the advantages of the invention.

In the accompanying drawings I have illustrated my invention in connection with the journal and hub of an automobile wheel in which the parts are combined and arranged according to the best mode I have so far devised for the practical application of the principles of my invention.

Figure 1 is a sectional view showing in section, two sets of the roller bearings between the journal and hub portion of an automobile or other vehicle wheel.

Fig. 2 is a view of one of the anti-friction roller bearings.

Fig. 3 is an enlarged view showing the grooved cone, cup, rollers and cage in operative position.

Fig. 4 is a perspective view showing the cage with the rollers supported therein and detached from the bearing.

In order to illustrate the invention I have utilized the journal 1 of an automobile or other vehicle axle and shown the disk plate 2 thereof in connection with the roller bearing device, and two bearing devices are inclosed within the hub 3 of the wheel, the hub being closed with its cap 4. At its inner end the hub, is provided with a bearing recess 5 bounded by the integral, annular flange or ring 6, and adapted to receive and retain the bearing cup 7. The inner face of the cup is fashioned with an obliquely disposed annular groove having angular faces 7' and 7ª, and the complementary cone 8 of the bearing, which is fixed on the journal 1 has an external groove with angular faces 8' and 8ª, between which grooved members the double conical rollers 9 are positioned. The double cone rollers have peripheries conforming to the interior and exterior grooves of the respective cup and cone, and in Fig. 3 it will be observed that the faces 7' and 8' are in parallelism while the faces 7ª and 8ª are also in parallelism, to receive and form races for the annular series of rollers 9. The grooves in the respective members are disposed in oblique, parallel planes, with the maximum diameter 9' of the double cone rollers seated in the depressions of the grooves and the peripheries of the cones between the complementary faces of the grooved members. Thus the points of contact for supporting the load are carried at two angles represented by the face 7ª and the face 7', the former angle being greater than the latter, to permit ready adjustment of the rollers between their contact members.

The rollers are symmetrical in outline, their double cones extending from their central maximum diameters at 9' and diminishing with uniformity, and provided with truncated ends from which project the reduced conical tips or points 10 10'. The conical rollers are supported in a cage of resilient or flexible steel or brass in the form of a truncated cone with angular flanges 11 and 12 at the edges of the body 13, and slots 14 are provided in the body of the cage to receive the rollers, while openings 15, 15 are fashioned in the flanges 11 and 12 into which the points 10 10' of the rollers are snapped to form bearings for the rollers in the cage.

In equipping the wheel hub and journal with the roller bearings as shown in Fig 1, at the end of the journal the cone 16 is formed integral with the threaded nut 17 which is screwed on the threaded end 18 of the journal and secured against displacement by the cotter pin 19 passed through the journal as shown. The cup 20 of this bearing is seated against the annular shoulder 21 of the hub and the rollers are retained between the cup and cone in manner similar to the bearing at the right in Fig. 1. By turning the nut 17, its conical part 15 is adjusted against the rollers and the cup 20 is backed against the shoulder 21 of the hub, and the action of the nut draws the cone 8 of the bearing at the right into adjusted position with relation to its rollers and the cup 7 which is backed against the flange 6 of the recess 5.

As thus arranged the two sets of bearings afford a stable support for bearing the load imposed thereon in such manner as to prevent any tendency of the bearing members to spread, and the races formed by the grooved cone and cup for the double conical rollers permit of an extremely close adjustment, but without danger of binding the parts.

Having thus fully described my invention, what I claim as new and desire to secure by Letters Patent is—

In a roller bearing, the combination with a cup member and a cone member having obliquely disposed complementary grooves, each groove having opposed faces of differing angularity, a cage of resilient material in the form of a truncated cone located between the members and having perforations and edge flanges, and double conical rollers in said cage having end bearing points adapted to be snapped into and retained in openings in said flanges.

In testimony whereof I affix my signature.

LEO S. CHRISTOPHERSON.